(12) United States Patent
Sood et al.

(10) Patent No.: US 9,215,772 B2
(45) Date of Patent: Dec. 15, 2015

(54) SYSTEMS AND METHODS FOR MINIMIZING POWER DISSIPATION IN A LOW-POWER LAMP COUPLED TO A TRAILING-EDGE DIMMER

(71) Applicant: Cirrus Logic, Inc., Austin, TX (US)

(72) Inventors: Mohit Sood, Cedar Park, TX (US); Vishwanathan Subramanian, Bangalore (IN)

(73) Assignee: Philips International B.V., Eindhoven (NL)

( * ) Notice: Subject to any disclaimer, the term of this patent is extended or adjusted under 35 U.S.C. 154(b) by 0 days.

(21) Appl. No.: 14/333,065

(22) Filed: Jul. 16, 2014

(65) Prior Publication Data

US 2015/0305107 A1    Oct. 22, 2015

Related U.S. Application Data

(60) Provisional application No. 61/980,954, filed on Apr. 17, 2014.

(51) Int. Cl.
*H05B 41/14* (2006.01)
*H05B 33/08* (2006.01)
(Continued)

(52) U.S. Cl.
CPC ............. *H05B 33/0845* (2013.01); *H02M 7/04* (2013.01); *H05B 37/02* (2013.01); *H05B 39/048* (2013.01)

(58) Field of Classification Search
CPC ............................. H05B 37/02; H05B 33/0815
USPC .......................................... 315/287, 291, 307
See application file for complete search history.

(56) References Cited

U.S. PATENT DOCUMENTS

| 4,523,128 A | 6/1985 | Stamm et al. |
|---|---|---|
| 5,055,746 A | 10/1991 | Hu et al. |

(Continued)

FOREIGN PATENT DOCUMENTS

| CN | 101637064 A | 1/2010 |
|---|---|---|
| CN | 101505568 A | 10/2012 |

(Continued)

OTHER PUBLICATIONS

Amanci, et al, "Synchronization System with Zero-Crossing Peak Detection Algorithm for Power System Applications", The 2010 International Power Electronics Conference, pp. 2984-2991, Toronto, Ontario, Canada.

(Continued)

*Primary Examiner* — Jason M Crawford
(74) *Attorney, Agent, or Firm* — Jackson Walker L.L.P.

(57) ABSTRACT

A controller may predict an estimated occurrence of a high-resistance state of a dimmer, wherein the high-resistance state occurs when the dimmer begins phase-cutting an alternating current voltage signal. The controller may also be configured to operate in a trailing-edge exposure mode for a period of time wherein the period of time includes a time of the estimated occurrence of the high-resistance state in order to allow the controller to detect the occurrence of the high-resistance state, wherein energy is transferred from an input to a dissipative element during the trailing-edge exposure mode. The controller may further be configured to minimize a time between a beginning of the period of time and the estimated occurrence of the high-resistance state by modifying the period of time based on an estimated charging time of a capacitor of the dimmer.

20 Claims, 8 Drawing Sheets

(51) Int. Cl.
*H02M 7/04* (2006.01)
*H05B 37/02* (2006.01)
*H05B 39/04* (2006.01)

(56) References Cited

U.S. PATENT DOCUMENTS

| | | | |
|---|---|---|---|
| 5,179,324 | A | 1/1993 | Audbert |
| 5,319,301 | A | 6/1994 | Callahan et al. |
| 5,321,350 | A | 6/1994 | Haas |
| 5,430,635 | A | 7/1995 | Liu |
| 5,691,605 | A | 11/1997 | Xia et al. |
| 5,770,928 | A | 6/1998 | Chansky et al. |
| 6,043,635 | A | 3/2000 | Downey |
| 6,046,550 | A | 4/2000 | Ference et al. |
| 6,091,205 | A | 7/2000 | Newman et al. |
| 6,211,624 | B1 | 4/2001 | Holzer |
| 6,380,692 | B1 | 4/2002 | Newman et al. |
| 6,407,514 | B1 | 6/2002 | Glaser et al. |
| 6,510,995 | B2 | 1/2003 | Muthu |
| 6,621,256 | B2 | 9/2003 | Muratov et al. |
| 6,713,974 | B2 | 3/2004 | Patchornik et al. |
| 6,714,425 | B2 | 3/2004 | Yamada et al. |
| 6,858,995 | B2 | 2/2005 | Lee et al. |
| 6,900,599 | B2 | 5/2005 | Ribarich |
| 7,102,902 | B1 | 9/2006 | Brown et al. |
| 7,180,250 | B1 | 2/2007 | Gannon |
| 7,184,937 | B1 | 2/2007 | Su et al. |
| 7,339,329 | B2 | 3/2008 | Makimura et al. |
| 7,656,103 | B2 | 2/2010 | Shteynberg et al. |
| 7,719,246 | B2 | 5/2010 | Melanson |
| 7,728,530 | B2 | 6/2010 | Wang et al. |
| 7,733,678 | B1 | 6/2010 | Notohamiprodjo et al. |
| 7,759,881 | B1 | 7/2010 | Melanson |
| 7,786,711 | B2 | 8/2010 | Wei et al. |
| 7,872,427 | B2 | 1/2011 | Scianna |
| 8,102,167 | B2 * | 1/2012 | Irissou et al. ............... 323/300 |
| 8,115,419 | B2 | 2/2012 | Given et al. |
| 8,169,154 | B2 | 5/2012 | Thompson et al. |
| 8,212,491 | B2 | 7/2012 | Kost |
| 8,212,492 | B2 | 7/2012 | Lam et al. |
| 8,222,832 | B2 | 7/2012 | Zheng et al. |
| 8,482,220 | B2 | 7/2013 | Melanson |
| 8,487,546 | B2 | 7/2013 | Melanson |
| 8,508,147 | B2 | 8/2013 | Shen |
| 8,536,794 | B2 | 9/2013 | Melanson et al. |
| 8,536,799 | B1 * | 9/2013 | Grisamore et al. ............ 315/294 |
| 8,547,034 | B2 * | 10/2013 | Melanson et al. ............ 315/247 |
| 8,569,972 | B2 | 10/2013 | Melanson |
| 8,581,518 | B2 | 11/2013 | Kuang et al. |
| 8,610,364 | B2 | 12/2013 | Melanson et al. |
| 8,610,365 | B2 | 12/2013 | King et al. |
| 8,664,885 | B2 | 3/2014 | Koolen et al. |
| 8,716,957 | B2 | 5/2014 | Melanson et al. |
| 8,749,173 | B1 | 6/2014 | Melanson et al. |
| 8,829,819 | B1 | 9/2014 | Angeles |
| 8,847,515 | B2 | 9/2014 | King et al. |
| 2004/0105283 | A1 | 6/2004 | Schie et al. |
| 2004/0212321 | A1 | 10/2004 | Lys |
| 2006/0022648 | A1 | 2/2006 | Ben-Yaakov et al. |
| 2006/0208669 | A1 | 9/2006 | Huynh et al. |
| 2007/0081611 | A1 | 4/2007 | Fudge |
| 2007/0182338 | A1 | 8/2007 | Shteynberg et al. |
| 2007/0182347 | A1 | 8/2007 | Shteynberg |
| 2008/0018261 | A1 | 1/2008 | Kastner |
| 2008/0101098 | A1 | 5/2008 | Disney |
| 2008/0143266 | A1 | 6/2008 | Langer |
| 2008/0192509 | A1 | 8/2008 | Dhuyvetter et al. |
| 2008/0205103 | A1 | 8/2008 | Sutardja et al. |
| 2008/0224629 | A1 | 9/2008 | Melanson |
| 2008/0224633 | A1 | 9/2008 | Melanson |
| 2008/0224636 | A1 | 9/2008 | Melanson |
| 2008/0225168 | A1 | 9/2008 | Ouslis |
| 2009/0044087 | A1 | 2/2009 | Chen |
| 2009/0134817 | A1 | 5/2009 | Jurngwirth et al. |
| 2009/0135632 | A1 | 5/2009 | Sohma |
| 2009/0195186 | A1 | 8/2009 | Guest et al. |
| 2009/0284182 | A1 | 11/2009 | Cencur |
| 2010/0002480 | A1 | 1/2010 | Huynh et al. |
| 2010/0013405 | A1 | 1/2010 | Thompson et al. |
| 2010/0013409 | A1 | 1/2010 | Quek et al. |
| 2010/0066328 | A1 | 3/2010 | Shimizu et al. |
| 2010/0164406 | A1 | 7/2010 | Kost et al. |
| 2010/0213859 | A1 | 8/2010 | Shteynberg et al. |
| 2010/0231136 | A1 | 9/2010 | Reisenbauer et al. |
| 2010/0244726 | A1 | 9/2010 | Melanson |
| 2011/0043133 | A1 | 2/2011 | Van Laanen et al. |
| 2011/0080110 | A1 | 4/2011 | Nuhfer et al. |
| 2011/0084622 | A1 | 4/2011 | Barrow et al. |
| 2011/0084623 | A1 | 4/2011 | Barrow |
| 2011/0115395 | A1 | 5/2011 | Barrow et al. |
| 2011/0121754 | A1 | 5/2011 | Shteynberg |
| 2011/0148318 | A1 | 6/2011 | Shackle et al. |
| 2011/0204797 | A1 | 8/2011 | Lin et al. |
| 2011/0204803 | A1 | 8/2011 | Grotkowski et al. |
| 2011/0234115 | A1 | 9/2011 | Shimizu et al. |
| 2011/0266968 | A1 | 11/2011 | Bordin et al. |
| 2011/0291583 | A1 | 12/2011 | Shen |
| 2011/0309759 | A1 | 12/2011 | Shteynberg et al. |
| 2012/0025724 | A1 * | 2/2012 | Melanson et al. ............. 315/201 |
| 2012/0043913 | A1 | 2/2012 | Melanson |
| 2012/0049752 | A1 | 3/2012 | King et al. |
| 2012/0068626 | A1 | 3/2012 | Lekatsas et al. |
| 2012/0098454 | A1 | 4/2012 | Grotkowski et al. |
| 2012/0112651 | A1 * | 5/2012 | King et al. ................... 315/224 |
| 2012/0133921 | A1 | 5/2012 | Kitagowa et al. |
| 2012/0286686 | A1 | 11/2012 | Watanabe et al. |
| 2013/0015768 | A1 | 1/2013 | Roberts et al. |
| 2013/0049621 | A1 | 2/2013 | Yan |
| 2013/0083424 | A1 | 4/2013 | Iwashiro |
| 2013/0154495 | A1 | 6/2013 | He |
| 2013/0241441 | A1 | 9/2013 | Myers et al. |
| 2013/0342123 | A1 * | 12/2013 | Melanson et al. ......... 315/200 R |
| 2014/0009078 | A1 | 1/2014 | Xie et al. |
| 2014/0009082 | A1 | 1/2014 | King et al. |
| 2014/0028214 | A1 * | 1/2014 | Mazumdar et al. ............ 315/279 |

FOREIGN PATENT DOCUMENTS

| | | |
|---|---|---|
| EP | 1164819 A1 | 12/2001 |
| EP | 2257124 A1 | 1/2010 |
| EP | 2232949 B1 | 9/2010 |
| JP | 2008053181 A | 3/2008 |
| JP | 2009170240 A | 7/2009 |
| WO | 9917591 A1 | 4/1999 |
| WO | 02096162 A1 | 11/2002 |
| WO | 2006079937 A1 | 8/2006 |
| WO | 2008029108 A1 | 3/2008 |
| WO | 2008112735 A2 | 9/2008 |
| WO | 2008112822 A2 | 9/2008 |
| WO | 2010011971 A1 | 1/2010 |
| WO | 2010027493 A2 | 3/2010 |
| WO | 2010035155 A2 | 4/2010 |
| WO | 2011008635 A1 | 1/2011 |
| WO | 2011050453 A1 | 5/2011 |
| WO | 2011056068 A2 | 5/2011 |
| WO | 2012016197 A1 | 2/2012 |

OTHER PUBLICATIONS

AZOTEQ, IQS17 Family, IQ Switch—ProxSense Series, IQS17 Datasheet V2.00.doc, Jan. 2007, pp. 1-51.

Chan et al, Design and Implementation of Dimmable Electronic Ballast Based on Integrated Inductor, IEEE Transactions on Power Electronics, vol. 22, No. 1, Jan. 2007, pp. 291-300.

Gonthier et al, EN55015 Compliant 500W Dimmer with Low-Losses Symmetrical Switches, EPE 2005—Dresden, 9 pages.

Green, A ballast that can be dimmed from a domestic (phase cut) dimmer, International Rectifier, El Segundo, CA, IRPLCFL3 rev.b, Aug. 25, 2003, 12 pages.

Hausman, Real-Time Illumination Stability Systems for Trailing-Edge (Reverse Phase Control) Dimmers, Technical white paper, Dec. 2004, version 1.0, Lutron Electronics Co. Inc., Coopersburg, PA.

Lee et al, A Novel Electrode Power Profiler for Dimmable Ballasts Using DC Link Voltage and Switching Frequency Controls, IEEE

(56) References Cited

OTHER PUBLICATIONS

Transactions on Power Electronics, vol. 19, No. 3, May 2004, pp. 847-853.
Light Dimmer Circuits, www.epanorama.net, 9 pages.
Lutron, Flourescent dimming systems technical guide, Lutron Electronics Co., Inc., Coopersburg, PA, 2002, 28 pages.
Lutron, Why Different Dimming Ranges? The Difference Between Measured and Perceived Light, 1 page.
O'Rourke, "Dimming Electronic Ballasts," National Lighting Product Information Program, Specifier Reports, vol. 7, No. 3, Oct. 1999, pp. 1-24.
Patterson, James, "Efficient Method for Interfacing TRIAC Dimmers and LEDs", National Semiconductor Corp., EDN, pp. 29-32, Jun. 23, 2011, USA.
Rand et al: "Issues, Models and Solutions for Triac Modulated Phase Dimming of LED Lamps" Power Electronics Specialists Conference, 2007, PESC 2007, IEEE, IEEE, P1, Jun. 1, 2007, pp. 1398-1404.
Supertex Inc, 56W Off-line LED Driver, 120VAC with PFC, 160V, 350mA Load, Dimmer Switch Compatible, Supertex, Inc., Sunnyvale CA, pp. 1-20.
Vainio, Olli, "Digital Filtering for Robust 50/60 Hz Zero-Crossing Detectors", IEEE Transactions on Instrumentation and Measurement, vol. 45, No. 2, Apr. 1996, pp. 426-430.
Wu et al, Single-Stage Electronic Ballast with Dimming Feature and Unity Power Factor, IEEE Transactions on Power Electronics, vol. 13, No. 3, May 1998, pp. 586-597.
Supertex, Inc., HV9931 Unity Power Factor LED Lamp Drive, pp. 1-7, 2005, Sunnyvale, CA, US.
International Search Report and Written Opinion, International Patent App. No. PCT/US2015/017109, mailed Jul. 1, 2015, 10 pages.
International Search Report and Written Opinion, International Patent App. No. PCT/US2015/026196, mailed Sep. 24, 2015, 9 pages.

\* cited by examiner

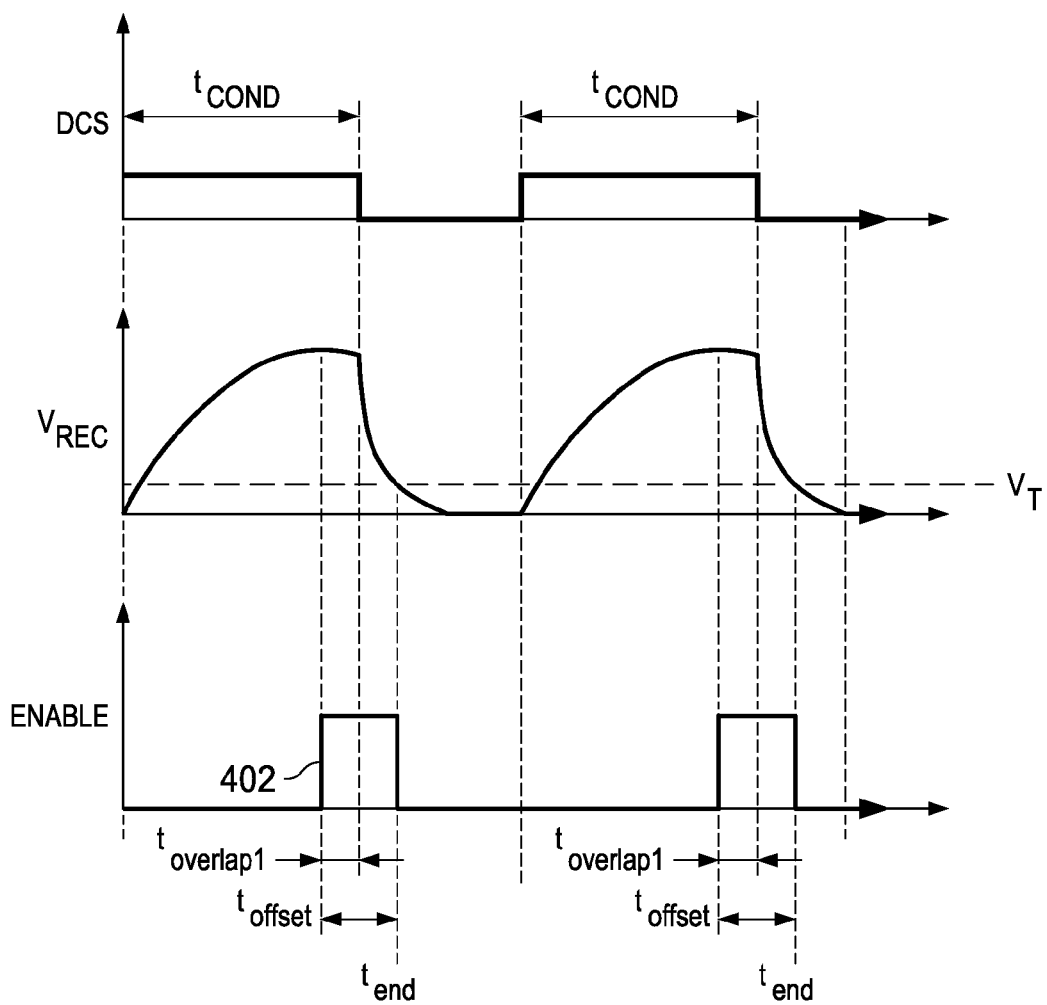

SYSTEMS AND METHODS FOR MINIMIZING POWER DISSIPATION IN A LOW-POWER LAMP COUPLED TO A TRAILING-EDGE DIMMER

RELATED APPLICATIONS

The present disclosure claims priority to U.S. Provisional Patent Application Ser. No. 61/980,954, filed Apr. 17, 2014, which is incorporated by reference herein in its entirety.

FIELD OF DISCLOSURE

The present disclosure relates in general to the field of electronics, and more specifically to systems and methods for ensuring compatibility between one or more low-power lamps and the power infrastructure to which they are coupled.

BACKGROUND

Many electronic systems include circuits, such as switching power converters or transformers that interface with a dimmer. The interfacing circuits deliver power to a load in accordance with the dimming level set by the dimmer. For example, in a lighting system, dimmers provide an input signal to a lighting system. The input signal represents a dimming level that causes the lighting system to adjust power delivered to a lamp, and, thus, depending on the dimming level, increase or decrease the brightness of the lamp. Many different types of dimmers exist. In general, dimmers generate an output signal in which a portion of an alternating current ("AC") input signal is removed or zeroed out. For example, some analog-based dimmers utilize a triode for alternating current ("triac") device to modulate a phase angle of each cycle of an alternating current supply voltage. This modulation of the phase angle of the supply voltage is also commonly referred to as "phase cutting" the supply voltage. Phase cutting the supply voltage reduces the average power supplied to a load, such as a lighting system, and thereby controls the energy provided to the load. A particular type of phase-cutting dimmer is known as a trailing-edge dimmer A trailing-edge dimmer phase cuts from the end of an AC cycle, such that during the phase-cut angle, the dimmer is "off" and supplies no output voltage to its load, but is "on" before the phase-cut angle and in an ideal case passes a waveform proportional to its input voltage to its load.

FIG. 1 depicts a lighting system 100 that includes a trailing-edge, phase-cut dimmer 102 and a lamp 142. FIG. 2 depicts example voltage and current graphs associated with lighting system 100. Referring to FIGS. 1 and 2, lighting system 100 receives an AC supply voltage $V_{SUPPLY}$ from voltage supply 104. The supply voltage $V_{SUPPLY}$, indicated by voltage waveform 200, is, for example, a nominally 60 Hz/110 V line voltage in the United States of America or a nominally 50 Hz/220 V line voltage in Europe. Trailing edge dimmer 102 phase cuts trailing edges, such as trailing edges 202 and 204, of each half cycle of supply voltage $V_{SUPPLY}$. Since each half cycle of supply voltage $V_{SUPPLY}$ is 180 degrees of the supply voltage $V_{SUPPLY}$, the trailing edge dimmer 102 phase cuts the supply voltage $V_{SUPPLY}$ at an angle greater than 0 degrees and less than 180 degrees. The phase cut, input voltage $V_{\Phi\_DIM}$ to lamp 142 represents a dimming level that causes the lighting system 100 to adjust power delivered to lamp 142, and, thus, depending on the dimming level, increase or decrease the brightness of lamp 142.

Dimmer 102 includes a timer controller 110 that generates dimmer control signal DCS to control a duty cycle of switch 112. The duty cycle of switch 112 is a pulse width (e.g., times $t_1$–$t_0$) divided by a period of the dimmer control signal (e.g., times $t_3$–$t_0$) for each cycle of the dimmer control signal DCS. Timer controller 110 converts a desired dimming level into the duty cycle for switch 112. The duty cycle of the dimmer control signal DCS is decreased for lower dimming levels (i.e., higher brightness for lamp 142) and increased for higher dimming levels. During a pulse (e.g., pulse 206 and pulse 208) of the dimmer control signal DCS, switch 112 conducts (i.e., is "on"), and dimmer 102 enters a low resistance state. In the low resistance state of dimmer 102, the resistance of switch 112 is, for example, less than or equal to 10 ohms. During the low resistance state of switch 112, the phase cut, input voltage $V_{\Phi\_DIM}$ tracks the input supply voltage $V_{SUPPLY}$ and dimmer 102 transfers a dimmer current $i_{DIM}$ to lamp 142.

When timer controller 110 causes the pulse 206 of dimmer control signal DCS to end, dimmer control signal DCS turns switch 112 off, which causes dimmer 102 to enter a high resistance state (i.e., turns off). In the high resistance state of dimmer 102, the resistance of switch 112 is, for example, greater than 1 megaohm. Dimmer 102 includes a capacitor 114, which charges to the supply voltage $V_{SUPPLY}$ during each pulse of the dimmer control signal DCS. In both the high and low resistance states of dimmer 102, the capacitor 114 remains connected across switch 112. When switch 112 is off and dimmer 102 enters the high resistance state, the voltage $V_C$ across capacitor 114 increases (e.g., between times $t_1$ and $t_2$ and between times $t_4$ and $t_5$). The rate of increase is a function of the amount of capacitance C of capacitor 114 and the input impedance of lamp 142. If effective input resistance of lamp 142 is low enough, it permits a high enough value of the dimmer current $i_{DIM}$ to allow the phase cut, input voltage $V_{\Phi\_DIM}$ to decay to a zero crossing (e.g., at times $t_2$ and $t_5$) before the next pulse of the dimmer control signal DCS.

Dimming a light source with dimmers saves energy when operating a light source and also allows a user to adjust the intensity of the light source to a desired level. However, conventional dimmers, such as a trailing-edge dimmer, that are designed for use with resistive loads, such as incandescent light bulbs, often do not perform well when supplying a raw, phase modulated signal to a reactive load such as a power converter or transformer, as is discussed in greater detail below.

FIG. 3 depicts a lighting system 100 that includes a lamp assembly 142 with controller 112 for providing compatibility between a low-power lamp comprising LEDs 132 and other elements of lighting system 100, as is known in the art. As shown in FIG. 3, lighting system 100 may include a voltage supply 104, a dimmer 102, and a lamp assembly 142. Voltage supply 104 may generate a supply voltage $V_{SUPPLY}$ that is, for example, a nominally 60 Hz/110 V line voltage in the United States of America or a nominally 50 Hz/220 V line voltage in Europe.

Dimmer 102 may comprise any system, device, or apparatus for generating a dimming signal to other elements of lighting system 100, the dimming signal representing a dimming level that causes lighting system 100 to adjust power delivered to a lamp, and, thus, depending on the dimming level, increase or decrease the brightness of lamp assembly 142. Thus, dimmer 102 may include a trailing-edge dimmer similar to that depicted in FIG. 1, or any other suitable dimmer.

Lamp assembly 142 may comprise any system, device, or apparatus for converting electrical energy (e.g., delivered by dimmer 102) into photonic energy (e.g., at LEDs 132). For example, lamp assembly 142 may comprise a multifaceted reflector form factor (e.g., an MR16 form factor) with a lamp comprising LEDs 132. As shown in FIG. 3, lamp assembly 142 may include a bridge rectifier 134, a power converter 136, a load capacitor 154, a controller 112, and a dissipative network comprising a resistor 122 and switch 124.

Bridge rectifier 134 may comprise any suitable electrical or electronic device as is known in the art for converting the whole of alternating current voltage signal $V_{\Phi\_DIM}$ into a rectified voltage signal $v_{REC}$ having only one polarity.

Power converter 136 may comprise any system, device, or apparatus configured to convert an input voltage (e.g., $v_{REC}$) to a different output voltage (e.g., $v_{OUT}$) wherein the conversion is based on a control signal (e.g., a pulse-width modulated control signal communicated from controller 112). Accordingly, power converter 136 may comprise a boost converter, a buck converter, a boost-buck converter, or other suitable power converter.

Output capacitor 154 may comprise any system, device, or apparatus to store energy in an electric field. Output capacitor 154 may be configured such that it stores energy generated by power converter 136 in the form of the voltage $v_{OUT}$.

LEDs 132 may comprise one or more light-emitting diodes configured to emit photonic energy in an amount based on the voltage $v_{OUT}$ across the LEDs 132.

Controller 112 may comprise any system, device, or apparatus configured to determine one or more characteristics of voltage $v_{REC}$ present at the input of power converter 136 and control an amount of current $i_{REC}$ drawn by power converter 136 or dissipated through resistor 122 based on such one or more characteristics of voltage $v_{REC}$.

A typical trailing-edge dimmer often requires a low-impedance input path when its dimmer switch (e.g., switch 112) opens. This low impedance path allows it to charge an internal capacitor (e.g., capacitor 114) of the trailing-edge dimmer, and thus to also appear to an LED lamp as a trailing-edge dimmer. In addition, such low impedance path may "expose" the trailing edge of the dimmer of a controller (e.g., controller 112), such that the controller may detect occurrence of the trailing edge in order to operate lamp assembly 142 in a desired manner. Accordingly, in lighting system 100, controller 112 may be configured to enable (e.g., activate, close, turn on, etc.) switch 124 via signal ENABLE to apply a low-impedance path comprising resistor 122 during a period of time proximate in time to the trailing edge in order to provide such required low impedance at the trailing edge. However, such low impedance cannot be applied all of the time, as it may result in high power dissipation in lamp assembly 142 compared to its wattage rating.

Although not depicted in FIG. 3, in some embodiments, a lighting system 100 may include a transformer (e.g., an electronic transformer) coupled between dimmer 102 and lamp assembly 142.

FIGS. 4A and 4B illustrate example voltage and current graphs associated with lighting system 100 shown in FIG. 3, and depicts traditional approaches to providing a low impedance to a trailing-edge dimmer at the trailing-edge of the dimmer. In such approaches, switch 124 may be enabled, as shown in waveform 402 for enable signal ENABLE, for a period of time ending at an estimated end of the conduction angle at time $t_{end}$ of the trailing-edge dimmer and beginning at a fixed time offset $t_{offset}$ from time $t_{end}$. The time $t_{end}$ may be estimated by determining when rectified voltage signal $v_{REC}$ crosses below a predetermined threshold voltage $V_T$. Accordingly, the low impedance of the dissipation network comprising resistor 122 and switch 124 is not turned on at all times. However, different trailing-edge dimmers may have different capacitances of their charging capacitors 114. Thus, the fixed offset $t_{offset}$ must typically be set for a dimmer with the largest charging capacitor capacitance supported by a lamp assembly, as a fall time of the trailing edge of rectified voltage signal $v_{REC}$ is directly proportional to dimmer capacitance. Thus, while these existing approaches may minimize power dissipation in resistor 122 when a lamp assembly 142 is coupled to a dimmer 102 having a large charging capacitor capacitance, such existing approaches may lead to high power dissipation in resistor 122 when a lamp assembly 142 is coupled to a dimmer 102 having a smaller charging capacitor capacitance. For example, in lighting systems 100 having a dimmer 102 with a relatively small capacitance (FIG. 4A) the time period $t_{overlap1}$ in which enable signal ENABLE may overlap with the conduction period of dimmer 102 (e.g., periods $t_{cond}$) may be larger than an analogous time period $t_{overlap2}$ in lighting systems 100 having a dimmer 102 with a larger capacitance (FIG. 4B), potentially resulting in higher power dissipation in lamp assembly 142 when coupled to a dimmer 102 with smaller capacitance.

SUMMARY

In accordance with the teachings of the present disclosure, certain disadvantages and problems associated with ensuring compatibility of a low-power lamp with a dimmer and a transformer may be reduced or eliminated.

In accordance with embodiments of the present disclosure, a controller may provide compatibility between a load and a trailing-edge dimmer, and may be configured to predict based on an input signal received at an input coupled to the load an estimated occurrence of a high-resistance state of a trailing-edge dimmer coupled to load, wherein the high-resistance state occurs when the trailing-edge dimmer begins phase-cutting an alternating current voltage signal. The controller may also be configured to operate in a trailing-edge exposure mode for a period of time wherein the period of time includes a time of the estimated occurrence of the high-resistance state in order to allow the controller to detect the occurrence of the high-resistance state, wherein energy is transferred from the input to a dissipative element during the trailing-edge exposure mode. The controller may further be configured to minimize a time between a beginning of the period of time and the estimated occurrence of the high-resistance state by estimating a charging time of a capacitor of the trailing-edge dimmer and modifying the period of time based on the charging time.

In accordance with these and other embodiments of the present disclosure, a method for providing compatibility between a load and a trailing-edge dimmer coupled to the load may include predicting based on an input signal received at an input coupled to the load an estimated occurrence of a high-resistance state of the trailing-edge, wherein the high-resistance state occurs when the trailing-edge dimmer begins phase-cutting an alternating current voltage signal. The method may also include operating in a trailing-edge exposure mode for a period of time wherein the period of time includes a time of the estimated occurrence of the high-resistance state in order to allow the controller to detect the occurrence of the high-resistance state, wherein energy is transferred from the input to a dissipative element during the trailing-edge exposure mode. The method may further include minimizing a time between a beginning of the period of time and the estimated occurrence of the high-resistance state by estimating a charging time of a capacitor of the trailing-edge dimmer and modifying the period of time based on the charging time.

Technical advantages of the present disclosure may be readily apparent to one of ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIGS. 4A and 4B illustrate example voltage and current graphs associated with the lighting system depicted in FIG. 3, as is known in the art;

DETAILED DESCRIPTION

Figure 5:
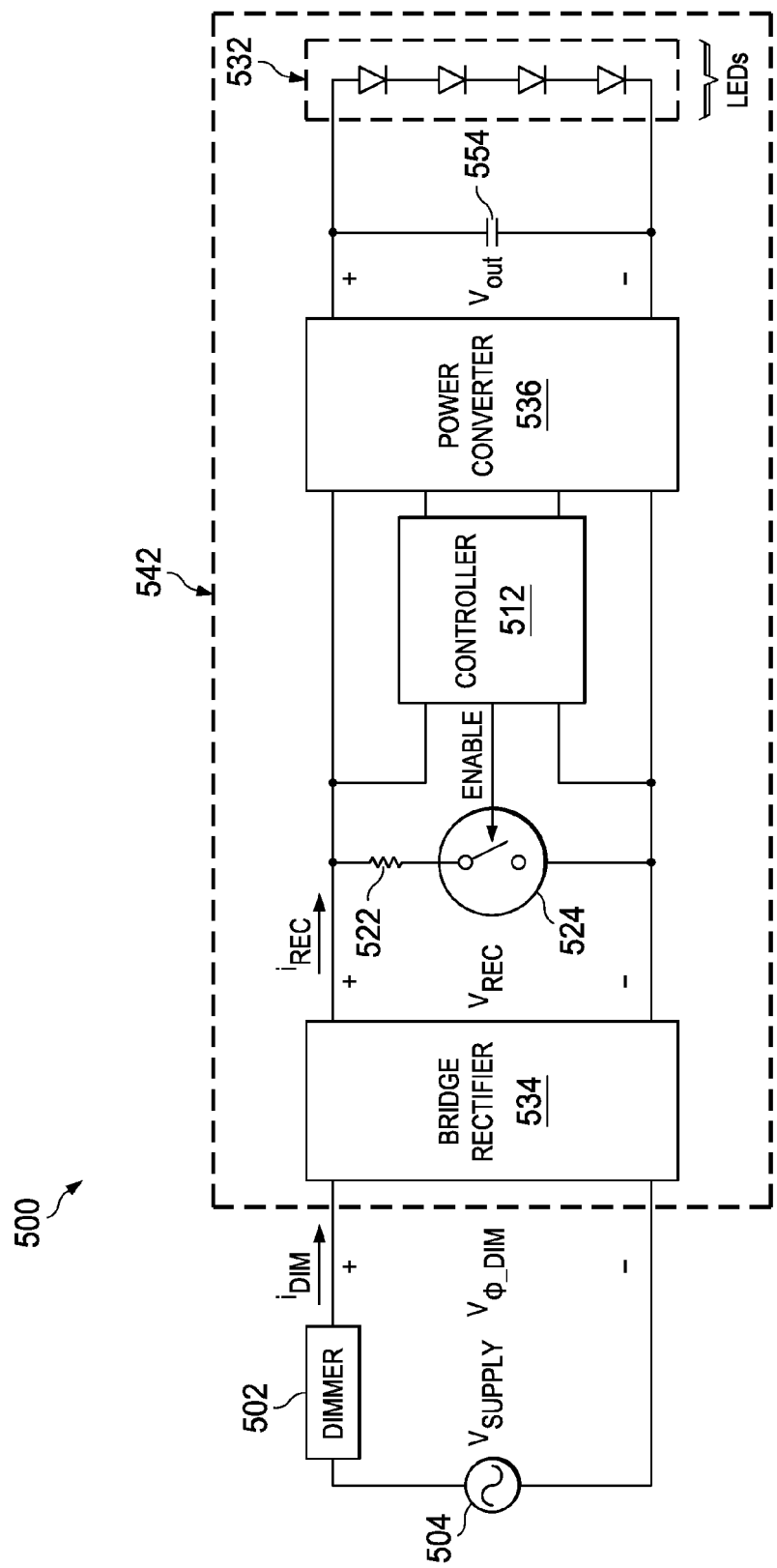
FIG. 5 illustrates an example lighting system including a controller for providing compatibility between a low-power lamp and an electronic transformer driven by a trailing-edge dimmer, in accordance with embodiments of the present disclosure.
Figure 6:
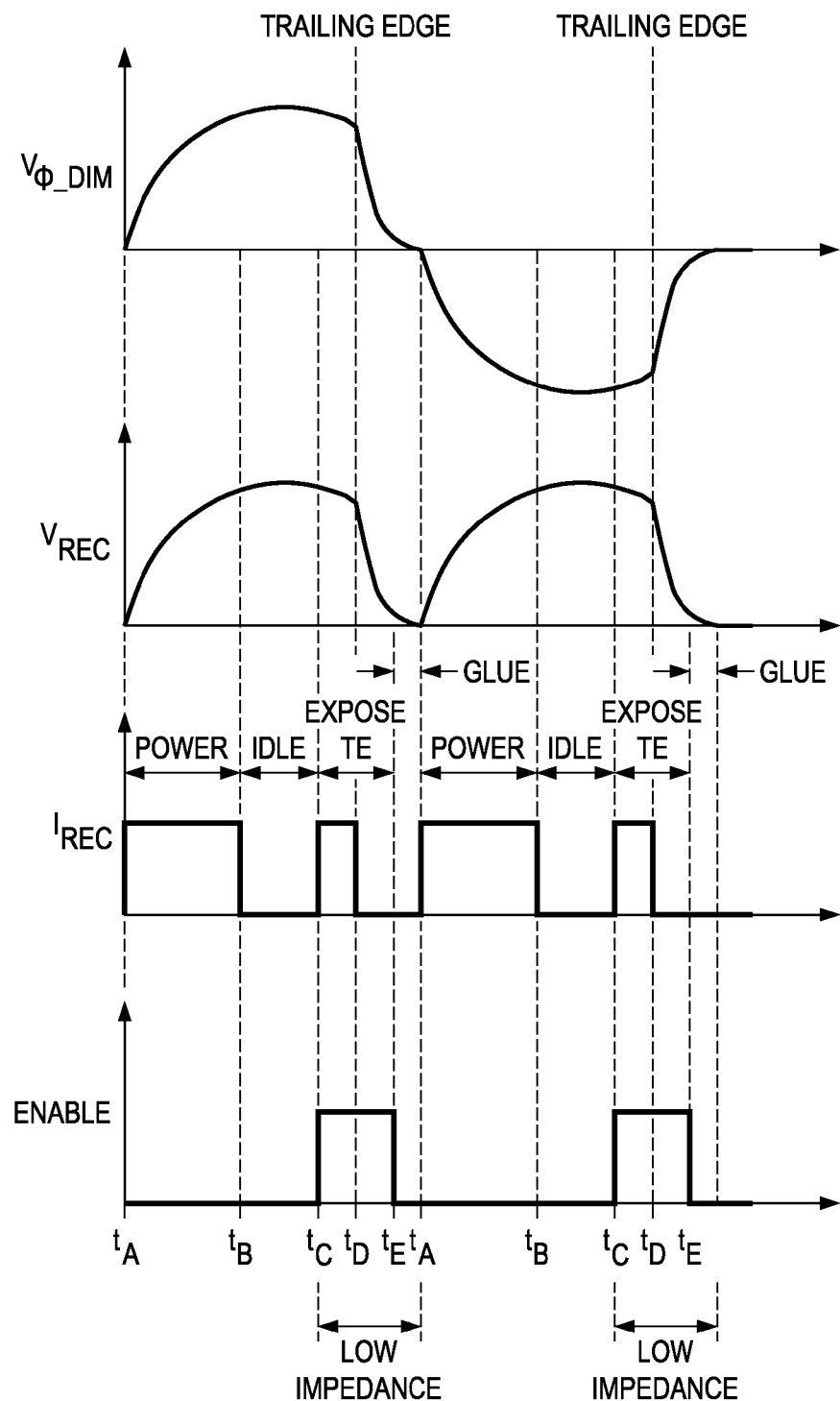
FIG. 6 illustrates example voltage and current graphs associated with embodiments of the lighting system depicted in FIG. 5, in accordance with embodiments of the present disclosure.

FIG. 5 illustrates an example lighting system 500 including a controller 512 for providing compatibility between a low-power lamp assembly 542 and other elements of a lighting system including a dimmer 502, in accordance with embodiments of the present disclosure. FIG. 6 depicts example voltage and current graphs associated with lighting system 500 depicted in FIG. 5, in accordance with embodiments of the present disclosure. As shown in FIG. 5, lighting system 500 may include a voltage supply 504, a dimmer 502, and a lamp assembly 542. Voltage supply 504 may generate a supply voltage $V_{SUPPLY}$ that is, for example, a nominally 60 Hz/110 V line voltage in the United States of America or a nominally 50 Hz/220 V line voltage in Europe.

Figure 1:
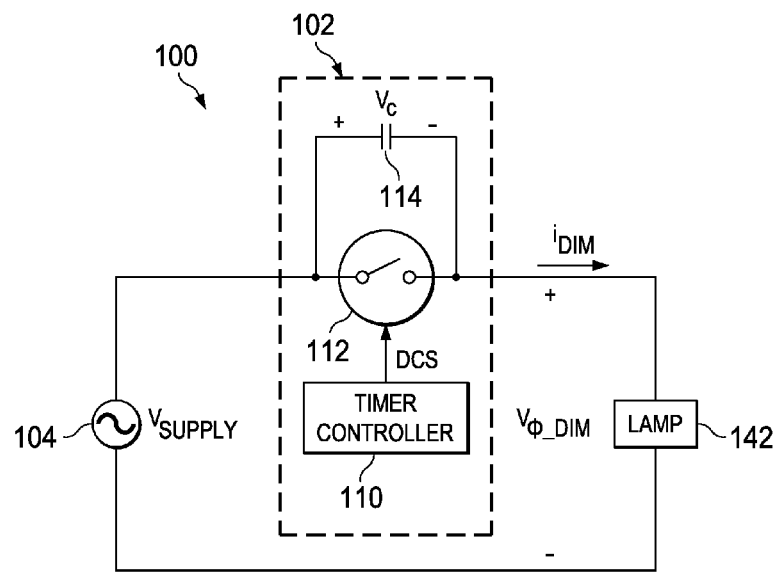
FIG. 1 illustrates a lighting system that includes a phase-cut trailing-edge dimmer, as is known in the art.
Figure 3:
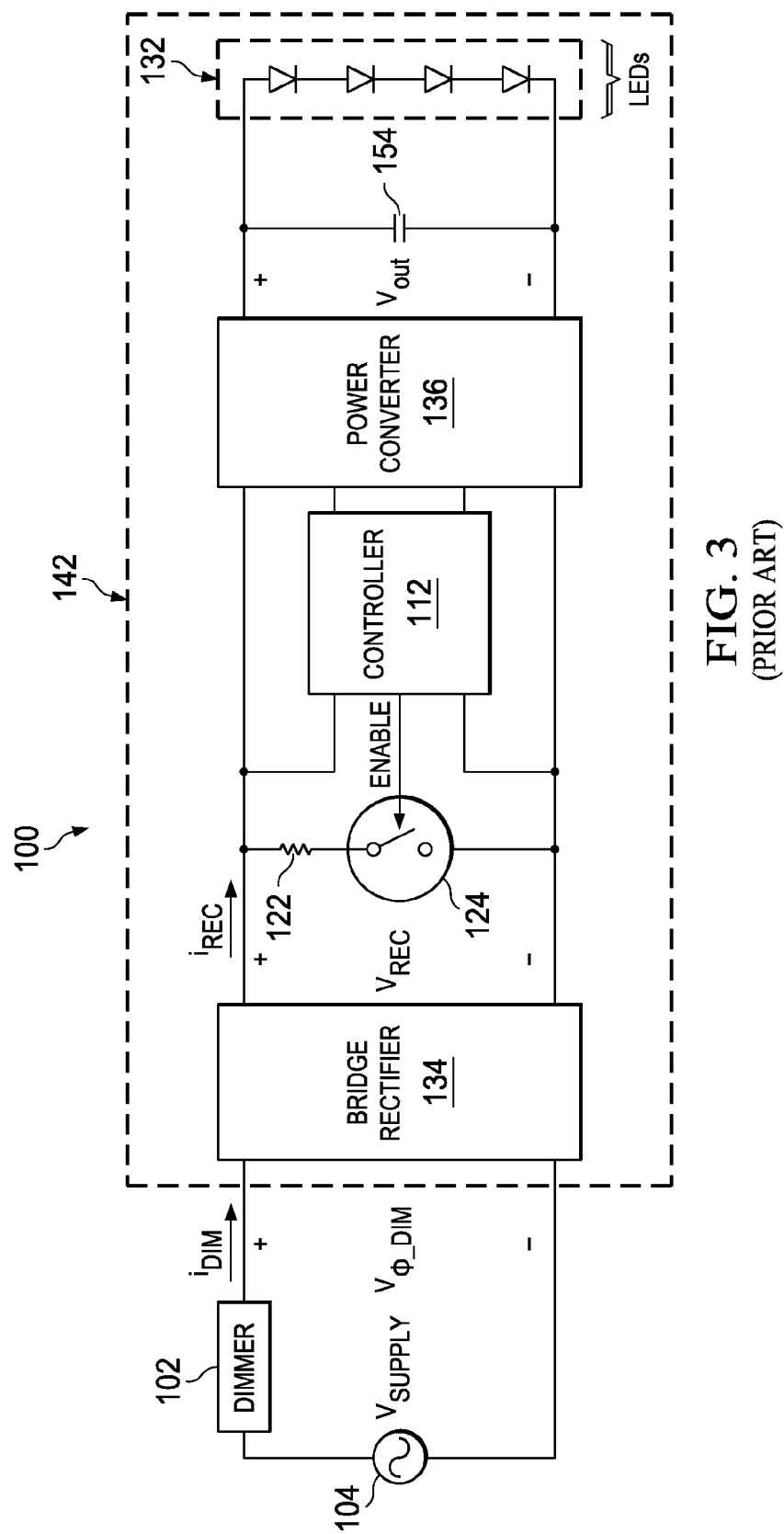
FIG. 3 illustrates a lighting system that includes a phase-cut trailing-edge dimmer, as is known in the art.
Figure 4B:
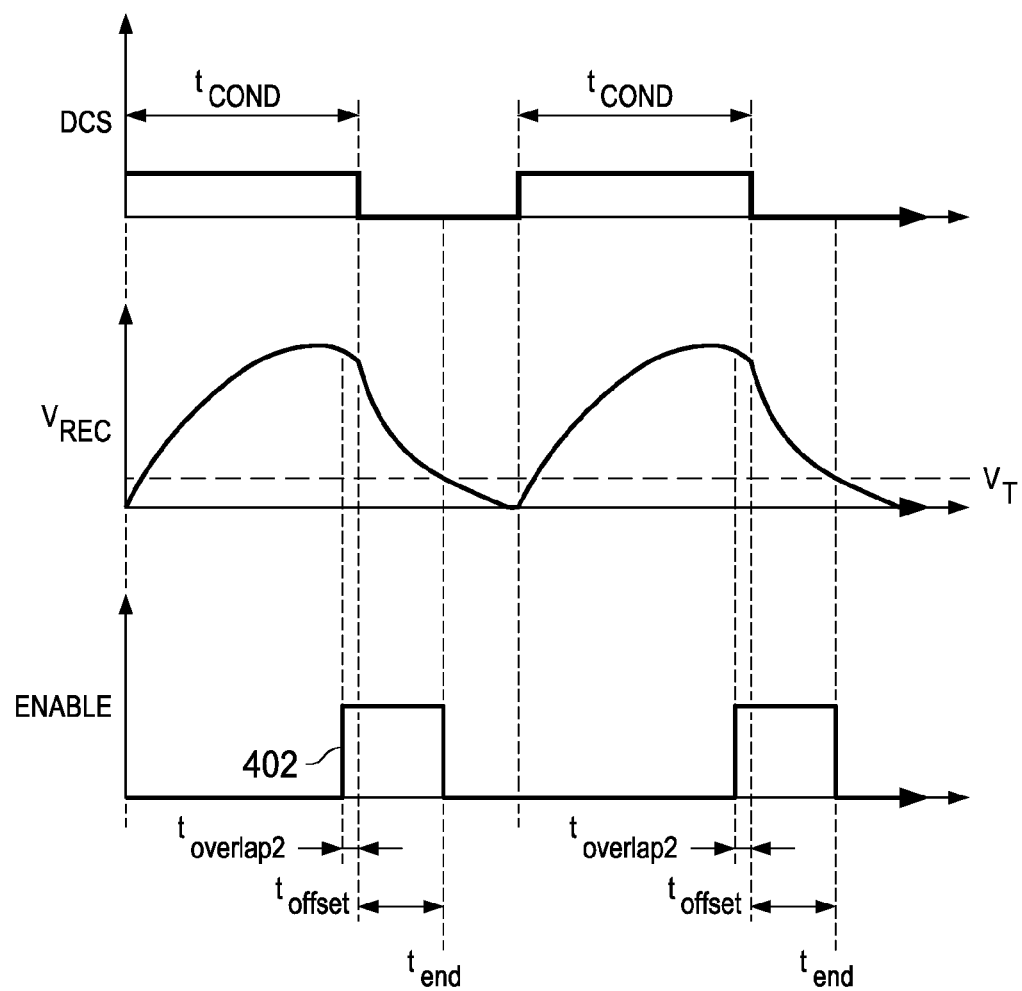

Dimmer 502 may comprise any system, device, or apparatus for generating a dimming signal to other elements of lighting system 500, the dimming signal representing a dimming level that causes lighting system 500 to adjust power delivered to a lamp, and, thus, depending on the dimming level, increase or decrease the brightness of lamp assembly 542. Thus, dimmer 502 may include a trailing-edge dimmer similar to that depicted in FIGS. 1 and 3, or any other suitable dimmer.

Lamp assembly 542 may comprise any system, device, or apparatus for converting electrical energy (e.g., delivered by dimmer 502) into photonic energy (e.g., at LEDs 532). In some embodiments, lamp assembly 542 may comprise a multifaceted reflector form factor (e.g., an MR16 form factor). In these and other embodiments, lamp assembly 542 may comprise an LED lamp. As shown in FIG. 5, lamp assembly 542 may include a bridge rectifier 534, a power converter 536, a load capacitor 554, a controller 512, and a dissipative network comprising a resistor 522 and a switch 524.

Bridge rectifier 534 may comprise any suitable electrical or electronic device as is known in the art for converting the whole of alternating current voltage signal $V_{\Phi\_DIM}$ into a rectified voltage signal $v_{REC}$ having only one polarity.

Power converter 536 may comprise any system, device, or apparatus configured to convert an input voltage (e.g., $v_{REC}$) to a different output voltage (e.g., $v_{OUT}$) wherein the conversion is based on a control signal (e.g., a pulse-width modulated control signal communicated from controller 512). Accordingly, power converter 536 may comprise a boost converter, a buck converter, a boost-buck converter, or other suitable power converter.

Output capacitor 554 may comprise any system, device, or apparatus to store energy in an electric field. Output capacitor 554 may be configured such that it stores energy generated by power converter 536 in the form of the voltage $v_{OUT}$.

LEDs 532 may comprise one or more light-emitting diodes configured to emit photonic energy in an amount based on the voltage $v_{OUT}$ across the LEDs 532.

Controller 512 may comprise any system, device, or apparatus configured to, as described in greater detail elsewhere in this disclosure, determine one or more characteristics of voltage $v_{REC}$ present at the input of power converter 536 and control an amount of current $i_{REC}$ drawn by power converter 536 based on such one or more characteristics of voltage $v_{REC}$. Operation of controller 512 may be described by reference to FIG. 6.

In operation, controller 512 may receive and analyze the rectified $v_{REC}$ to determine one or more characteristics of the rectified voltage $v_{REC}$. For example, controller 512 may be configured to detect an estimated occurrence of a beginning (occurring at time $t_A$) of the half line cycle of the supply voltage $V_{SUPPLY}$ and dimmer voltage $V_{\Phi\_DIM}$. For example, the estimated occurrence of the beginning of the half-line cycle of supply voltage $V_{SUPPLY}$ of dimmer 502 may be predicted by determining when dimmer voltage $V_{\Phi\_DIM}$ increases above some predetermined threshold voltage, and estimating the beginning of the half-line cycle based on such determination. As another example, controller 512 may be configured to detect an estimated occurrence of a negative edge of the $V_{REC}$ waveform occurring at time $t_D$ during each half-line cycle corresponding to the trailing edge of output signal $V_{\Phi\_DIM}$ of dimmer 502 (e.g., the estimated occurrence of the high-resistance state of dimmer 502). The estimated occurrence of the trailing edge/high-resistance state of dimmer 502 may be predicted in any suitable manner, for example, using systems and methods disclosed in U.S. patent application Ser. No. 13/298,002 filed Nov. 16, 2011 and entitled "Trailing Edge Dimmer Compatibility with Dimmer High Resistance Prediction," which is incorporated in its entirety herein for all purposes. Alternatively, the estimated occurrence of the trailing edge/high-resistance state of dimmer 502 may be predicted by determining when dimmer voltage $V_{\Phi\_DIM}$ decreases below some predetermined threshold voltage, and estimating the trailing edge/high-resistance state of dimmer 502 based on such determination.

From such determination of the estimated occurrences of the beginning of a half-line cycle, the negative edge, and/or other parameters of the signal present on the input of lamp assembly 542, controller 512 may determine the estimated half-line cycle of supply voltage $V_{supply}$ (e.g., based on the difference between successive estimated occurrences of the beginning of the half-line cycle, negative edge or other parameters), the estimated phase angle of dimmer 502 (e.g., based on the difference between an estimated occurrence of the beginning of the half-line cycle and an estimated occurrence of a subsequent negative edge), and/or other characteristics of the rectified voltage $V_{REC}$. Thus, during each half-line cycle, controller 512 may use characteristics determined during the previous half-line cycle to control operation of lamp assembly 542.

Based on one or more of the characteristics of the rectified voltage $V_{REC}$ described above, controller 512 may sequentially operate power converter 536 in a plurality of modes. For example, in some instances, controller 512 may operate sequentially in a high-current power mode (during the period labeled as "POWER" in FIG. 6), a low-current idle mode (during the period labeled as "IDLE" in FIG. 6), a low-impedance trailing-edge exposure mode (during the period labeled as "EXPOSE TE" in FIG. 6), and a low-impedance glue mode (during the period labeled as "GLUE" in FIG. 6), as described in greater detail below.

For example, from approximately the estimated occurrence of the beginning of the half-line cycle at time $t_A$ to a subsequent time $t_B$, controller 512 may operate in a high-current power mode in which it enables power converter 536, allowing power converter 536 to draw a substantially non-zero current $I_{REC}$ such that energy is transferred from the input of lamp assembly 542 to LEDs 532. A duration of the power mode (e.g., $t_B$–$t_A$) may be based on the estimated phase angle of dimmer 502 determined by controller 512.

Following the power mode, controller 512 may enter a low-current idle mode from time $t_B$ to time $t_C$ in which it disables power converter 536 such that substantially no energy is delivered from the input of lamp assembly 542 to output capacitor 554.

Following the idle mode, controller 512 may enter a high-current trailing-edge exposure mode in which it enables switch 524 via enable signal ENABLE from time $t_C$ to time $t_E$ to allow controller 512 to detect the negative edge and allow lamp assembly 542 to provide a low input impedance to dimmer 502 via resistor 522. The time $t_C$ may occur at a period of time before a predicted occurrence of the negative edge (based on the determination of the estimated occurrence of the negative edge from the previous half-line cycle) and time $t_E$ may occur at the detection of the estimated occurrence of the negative edge at time $t_D$. In some embodiments, during the trailing-edge exposure mode, power converter 536 may draw a substantially non-zero current (in addition to or in lieu of dissipation of energy via resistor 522 and switch 524) such that energy is transferred from the input of lamp assembly 542 to output capacitor 554, which may also allow controller 512 to detect the negative edge and allow lamp assembly 542 provide a low input impedance to dimmer 502. In these and other embodiments, controller 512 may enable the dissipative network of resistor 522 and switch 524, such that resistor 522 provides all or part of the low-impedance path during the trailing-edge exposure mode. In these and other embodiments, controller 512 may control the cumulative durations of the power mode and the trailing-edge exposure mode such that the power delivered from the input of lamp assembly 542 to LEDs 532 in each half-line cycle is commensurate with the control setting and phase-cut angle of dimmer 502.

Following the trailing-edge exposure mode, from time $t_E$ to the beginning of the subsequent power mode at time $t_A$ (e.g., at the estimated occurrence of the beginning of a subsequent half-line cycle), controller 512 may enter a low-impedance glue mode in which it continues to enable power converter 536, but substantially zero current $I_{REC}$ is delivered to power converter 536, on account of the phase cut of dimmer 502 and a substantially zero voltage $V_{REC}$. The glue mode may apply a low impedance to the input of lamp assembly 542, thus allowing discharge of any residual energy stored in lighting system 500. After glue mode, controller 512 may again enter the power mode.

Figure 8:
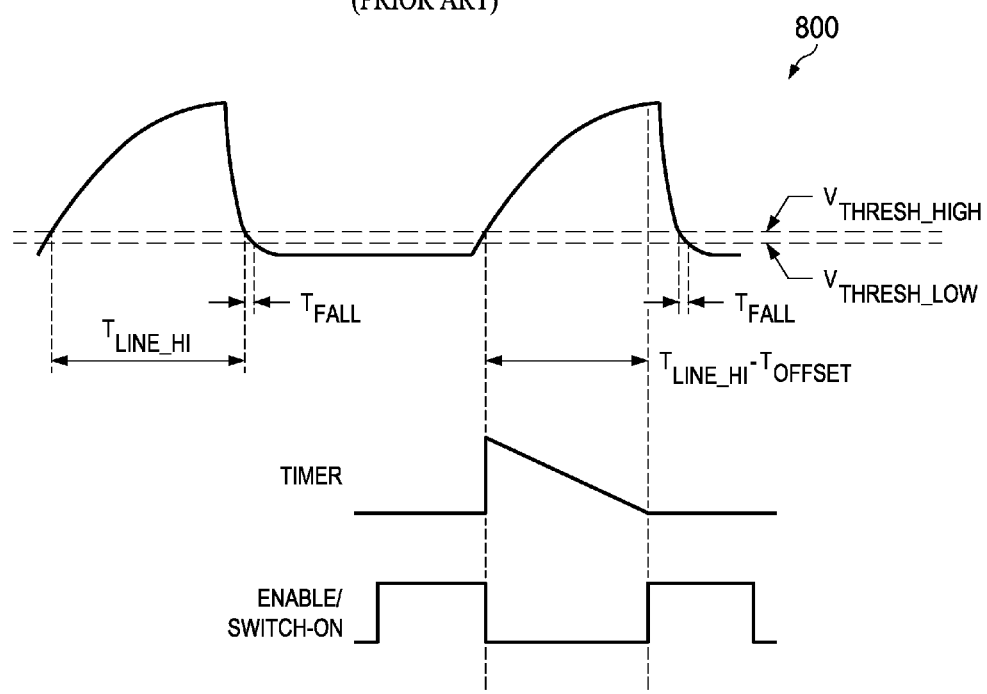
FIG. 8 illustrates example voltage graphs associated with embodiments of the trailing-edge enable signal control circuit depicted in FIG. 7, in accordance with embodiments of the present disclosure.
Figure 2:
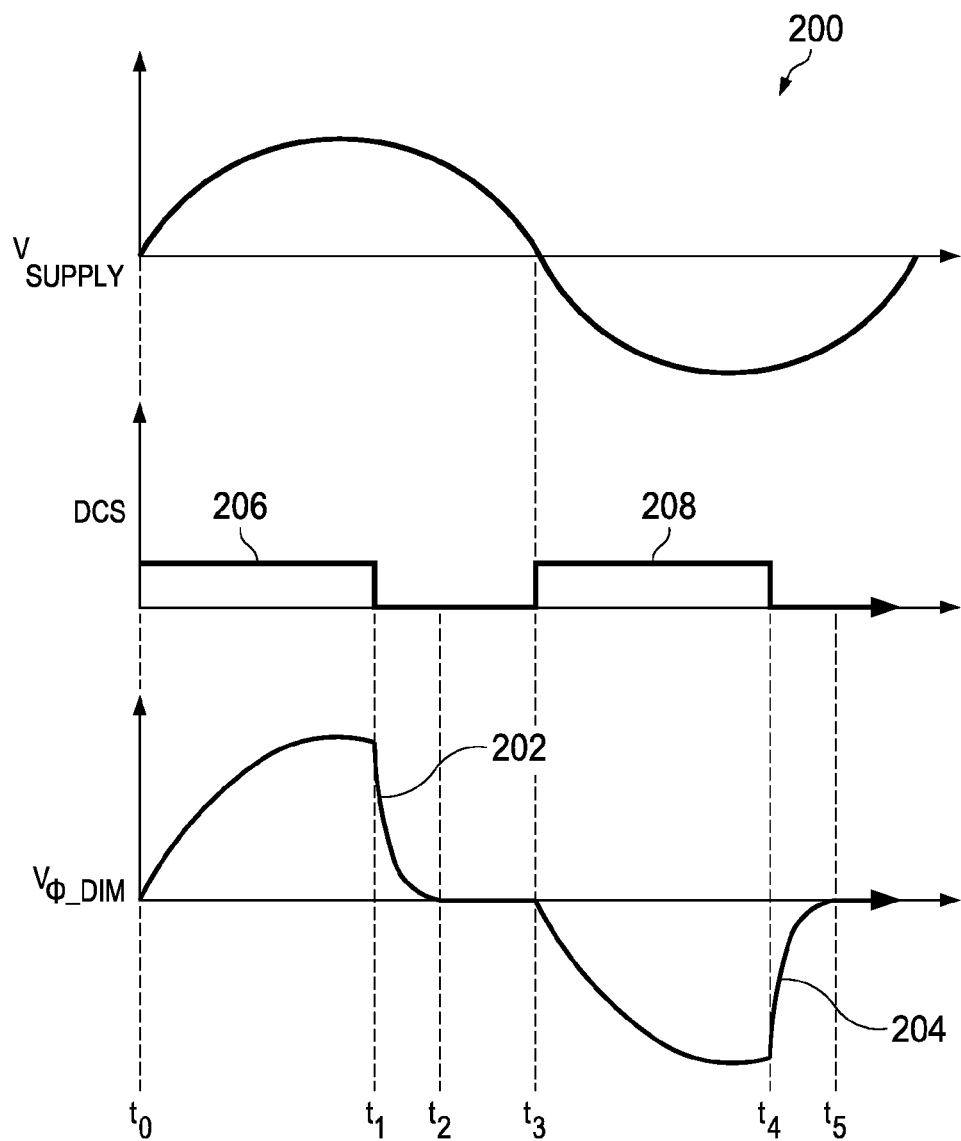
FIG. 2 illustrates example voltage and current graphs associated with the lighting system depicted in FIG. 1, as is known in the art.
Figure 7:
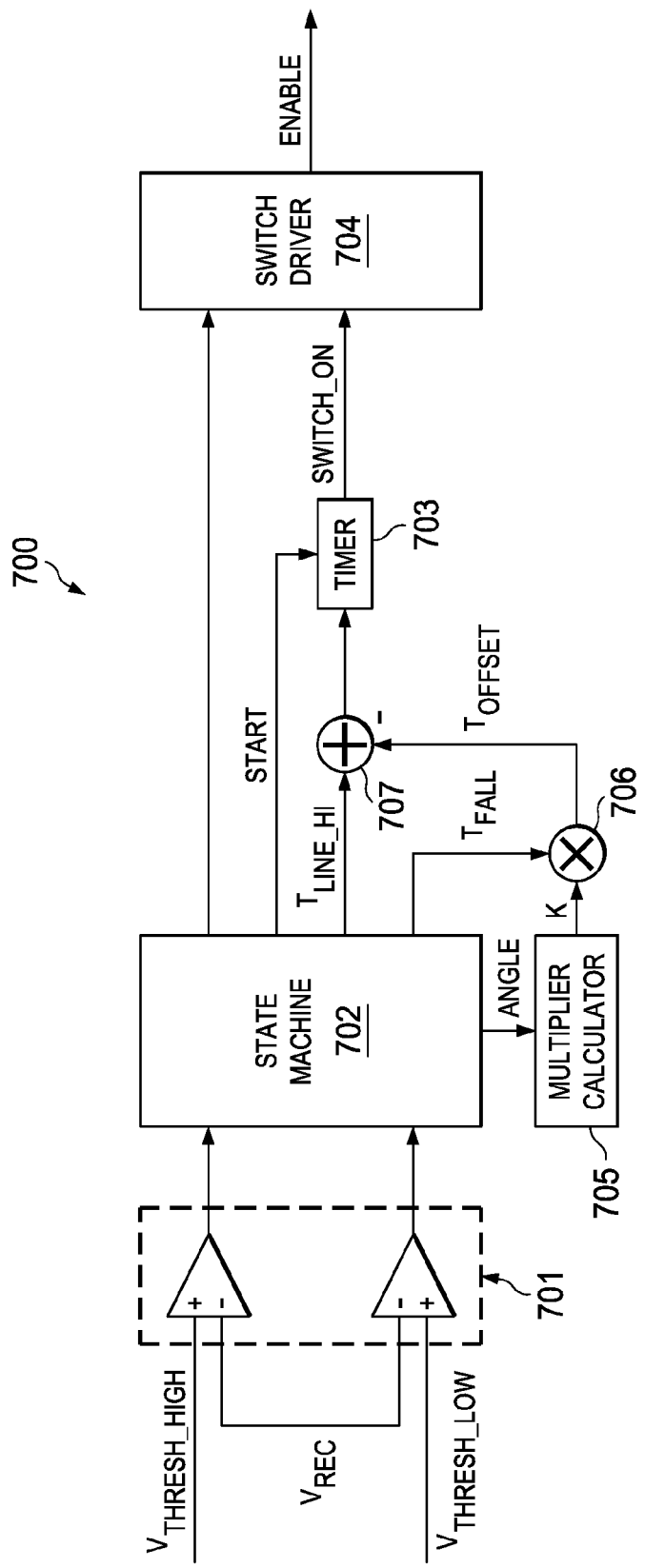
FIG. 7 illustrates selected components of a trailing-edge enable signal control circuit of a controller for the lighting system depicted in FIG. 5, in accordance with embodiments of the present disclosure.

FIG. 7 illustrates selected components of a trailing-edge enable signal control circuit 700 of controller 512, in accordance with embodiments of the present disclosure. FIG. 8 illustrates example voltage graphs 800 associated with embodiments of trailing-edge enable signal control circuit 700 depicted in FIG. 7, in accordance with embodiments of the present disclosure. As shown in FIG. 7, control circuit 700 may comprise a dual comparator 701, a state machine 702, a timer 703, a switch driver 704, a multiplier calculator 705, a multiplier 706, and a summer 707. Dual comparator 701 may comprise any system, device, or apparatus configured to determine whether rectified voltage signal $v_{REC}$ is above or below a first predetermined threshold voltage $V_{THRESH\_HIGH}$ and determine whether rectified voltage signal $v_{REC}$ is above or below a second predetermined threshold voltage $V_{THRESH\_LOW}$ which is lesser than first predetermined threshold voltage $V_{THRESH\_HIGH}$. Based on these determinations, state machine 702 may be configured to estimate a phase angle ANGLE of dimmer 502, a partial fall time $T_{FALL}'$ of the rectified voltage signal $v_{REC}$ during a trailing edge, and/or a time $T_{LINE\_HI}$ within each half-line cycle of rectified voltage signal $v_{REC}$ in which the rectified voltage signal $v_{REC}$ remains above first predetermined threshold voltage $V_{THRESH\_HIGH}$ (e.g., which may approximate a conduction period $t_{cond}$ of dimmer 502). For example, the phase angle ANGLE may be determined by dividing time $T_{LINE\_HI}$ of a previous half-line cycle by a duration of time between the two most recent crossings of rectified voltage signal $v_{REC}$ from below to above first predetermined threshold voltage $V_{THRESH\_HIGH}$. As another example, partial fall time $t_{FALL}'$ may be estimated as a period of time between a previous crossing of rectified voltage signal $v_{REC}$ from above to below second predetermined threshold voltage $V_{THRESH\_LOW}$ and a previous crossing of rectified voltage signal $v_{REC}$ from above to below first predetermined threshold voltage $V_{THRESH\_HIGH}$. Such partial fall time $t_{FALL}'$ may be a function of a capacitance of a charging capacitor present in dimmer 502.

It is noted that the value of partial fall time $t_{FALL}'$ will include only a portion of the actual fall time of rectified voltage signal $v_{REC}$. The actual fall time is a multiplicative factor K multiplied by partial fall time $t_{FALL}'$, wherein multiplicative factor K is a function of the phase angle ANGLE. For example, for medium values of phase angle ANGLE (e.g., 50% conduction), multiplicative factor K may be higher than for lower or higher values of phase angle PHASE (e.g., 10% conduction, 90% conduction). Thus, based on a phase angle estimated by state machine 702, multiplier calculator 705 may calculate multiplicative factor K. In some embodiments, multiplier calculator 705 may calculate multiplicative factor K with a polynomial function, for example, with an equation K(ANGLE)=A×ANGLE$^2$+B×ANGLE+C, where coefficients A, B, and C may be programmable by a user or set based on characterization and testing of a lamp assembly 542.

Multiplier 706 may estimate a time offset t equal to multiplicative factor K multiplied by partial fall time $t_{FALL}'$, such that time offset $t_{offset}$ is approximately equal to an actual fall time of rectified voltage signal $v_{REC}$ and thus serves as an estimate of the actual fall time. Such actual fall time may also approximate a charging time of a charging capacitor of dimmer 502, such that time offset $t_{offset}$ serves as an estimate of the actual fall time charging time of such charging capacitor of dimmer 502.

Summer 707 may subtract time offset $t_{offset}$ from time $T_{LINE\_HI}$, with such resulting time duration being output to a timer 703. Timer 703 may be configured to start/initialize upon rectified voltage signal $v_{REC}$ rising from below to above first predetermined threshold voltage $V_{THRESH\_HIGH}$ and once started, times the duration $T_{LINE\_HI}-t_{offset}$. Between expiration of timer 703 and its subsequent initialization, timer 703 may assert signal SWITCH_ON which in turn enables switch driver 704 to assert the enable control signal ENABLE, thus enabling switch 524, providing a low impedance at the input of lamp assembly 542, and thus carrying out the trailing-edge exposure mode. Between an initialization of timer 703 and its subsequent expiration, timer 703 may deassert signal SWITCH_ON which in turn enables switch driver 704 to deassert the enable control signal ENABLE, thus disabling switch 524.

Control circuit 700 may be implemented using controller 512 or any other system operable to control circuit 700. In certain embodiments, control circuit 700 may be implemented partially or fully in software and/or firmware embodied in computer-readable media and executable on a processor (e.g., controller 512) of lamp assembly 542.

Accordingly, using the methods and systems described herein, the duration of a trailing-edge exposure mode of a lamp assembly may be minimized in accordance with a charging time of a trailing-edge dimmer (wherein such charging time may be a function of a capacitance of a charging capacitor of the dimmer), thus potentially reducing power consumed by a lamp assembly. In addition, as parameters (e.g., resistances, capacitances, inductances, etc.) of components of a lighting system vary with age, temperature, and/or other factors, the systems and methods described herein may dynamically control duration of the trailing-edge exposure mode to provide an adequate duration for the trailing-edge exposure mode while reducing power consumption.

As used herein, when two or more elements are referred to as "coupled" to one another, such term indicates that such two or more elements are in electronic communication whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An apparatus comprising:
   a controller to provide compatibility between a load and a trailing-edge dimmer, wherein the controller is configured to:
   predict based on an input signal received at an input an estimated occurrence of a high-resistance state of a trailing-edge dimmer coupled to the load, wherein the high-resistance state occurs when the trailing-edge dimmer begins phase-cutting an alternating current voltage signal;
   operate in a trailing-edge exposure mode for a period of time wherein the period of time includes a time of the estimated occurrence of the high-resistance state in order to allow the controller to detect the occurrence of the high-resistance state, wherein energy is transferred from the input to a dissipative element during the trailing-edge exposure mode; and
   minimize a time between a beginning of the period of time and the estimated occurrence of the high-resistance state by:
   estimating a charging time of a capacitor of the trailing-edge dimmer; and
   modifying the period of time based on the charging time.

2. The apparatus of claim 1, wherein the dissipative element comprises the load.

3. The apparatus of claim 1, wherein the dissipative element comprises an element other than the load.

4. The apparatus of claim 1, wherein estimating the charging time comprises at least one of:
   estimating a fall time of the input signal; and
   estimating a control setting of the trailing-edge dimmer based on the input signal.

5. The apparatus of claim 1, wherein:
   estimating the charging time comprises:
   estimating a partial fall time of the input signal; and
   estimating a control setting of the trailing-edge dimmer based on the input signal; and
   modifying the period of time comprises:
   estimating an actual fall time equal to the partial fall time multiplied by a multiplier which is a function of the control setting; and
   setting a duration of the period of time equal to the actual fall time.

6. The apparatus of claim 1, wherein the controller is further configured to operate such that a low input impedance is provided at the input during the trailing-edge exposure mode.

7. The apparatus of claim 1, wherein the controller is further configured to operate in a glue mode immediately after the period of time, such that a power converter provides a low input impedance to the input during the glue mode.

8. The apparatus of claim 1, wherein the load comprises a lamp.

9. The apparatus of claim 8, wherein the lamp comprises a light-emitting diode lamp.

10. The apparatus of claim 8, wherein the lamp further comprises a multifaceted reflector form factor.

11. A method for providing compatibility between a load and a trailing-edge dimmer coupled to the load comprising:
predicting based on an input signal received at an input an estimated occurrence of a high-resistance state of the trailing-edge dimmer, wherein the high-resistance state occurs when the trailing-edge dimmer begins phase-cutting an alternating current voltage signal;
operating in a trailing-edge exposure mode for a period of time wherein the period of time includes a time of the estimated occurrence of the high-resistance state in order to allow a controller to detect the occurrence of the high-resistance state, wherein energy is transferred from the input to a dissipative element during the trailing-edge exposure mode; and
minimizing a time between a beginning of the period of time and the estimated occurrence of the high-resistance state by:
estimating a charging time of a capacitor of the trailing-edge dimmer; and
modifying the period of time based on the charging time.

12. The method of claim 11, wherein the dissipative element comprises the load.

13. The method of claim 11, wherein the dissipative element comprises an element other than the load.

14. The method of claim 11, wherein estimating the charging time comprises at least one of:
estimating a fall time of the input signal; and
estimating a control setting of the trailing-edge dimmer based on the input signal.

15. The method of claim 11, wherein:
estimating the charging time comprises:
estimating a partial fall time of the input signal; and
estimating a control setting of the trailing-edge dimmer based on the input signal; and
modifying the period of time comprises:
estimating an actual fall time equal to the partial fall time multiplied by a multiplier which is a function of the control setting; and
setting a duration of the period of time equal to the actual fall time.

16. The method of claim 11, further comprising operating such that a low input impedance is provided at the input during the trailing-edge exposure mode.

17. The method of claim 11, further comprising operating in a glue mode immediately after the period of time, such that a low input impedance is provided at the input during the glue mode.

18. The method of claim 11, wherein the load comprises a lamp.

19. The method of claim 18, wherein the lamp comprises a light-emitting diode lamp.

20. The method of claim 18, wherein the lamp further comprises a multifaceted reflector form factor.

* * * * *